US011891139B1

(12) United States Patent
Taylor

(10) Patent No.: US 11,891,139 B1
(45) Date of Patent: Feb. 6, 2024

(54) LIGHTWEIGHT TRAILER

(71) Applicant: Joseph William Taylor, Overland Park, KS (US)

(72) Inventor: Joseph William Taylor, Overland Park, KS (US)

( * ) Notice: Subject to any disclaimer, the term of this patent is extended or adjusted under 35 U.S.C. 154(b) by 523 days.

(21) Appl. No.: 17/097,950

(22) Filed: Nov. 13, 2020

Related U.S. Application Data

(60) Provisional application No. 63/087,429, filed on Oct. 5, 2020, provisional application No. 63/062,787, filed on Aug. 7, 2020, provisional application No. 62/936,074, filed on Nov. 15, 2019.

(51) Int. Cl.
*B62D 63/06* (2006.01)
*B62D 63/08* (2006.01)

(52) U.S. Cl.
CPC ......... *B62D 63/061* (2013.01); *B62D 63/062* (2013.01); *B62D 63/08* (2013.01)

(58) Field of Classification Search
CPC ..... B62D 63/061; B62D 63/062; B62D 63/08
See application file for complete search history.

(56) References Cited

U.S. PATENT DOCUMENTS

| 4,239,258 A | 12/1980 | Burris | |
| 4,362,316 A * | 12/1982 | Wright | B62D 63/061 280/493 |
| 4,746,142 A * | 5/1988 | Davis | B62D 63/061 280/37 |
| 4,786,073 A * | 11/1988 | Harper | B62D 63/061 280/491.1 |
| 4,934,722 A | 6/1990 | Goetzelman | |
| 4,934,733 A | 6/1990 | Smith et al. | |
| 5,316,326 A * | 5/1994 | Kyriacou | B62D 49/08 280/6.154 |
| 5,275,430 A | 6/1994 | Smith | |
| 5,340,145 A | 8/1994 | Leib et al. | |
| 5,354,090 A * | 10/1994 | Grovom | B62D 63/061 280/638 |
| 5,560,639 A | 10/1996 | Nowell et al. | |
| 5,647,064 A * | 7/1997 | Whittaker | A42B 1/002 2/181.2 |
| 5,924,836 A | 7/1999 | Kelly | |
| 5,951,032 A | 9/1999 | Overby et al. | |
| 6,254,117 B1 * | 7/2001 | Cross | B62D 63/062 280/491.1 |

(Continued)

FOREIGN PATENT DOCUMENTS

DE 202009005772 U1 * 8/2009 ............. B62D 21/14
DE 102009017925 A1 * 11/2010 ........... B62D 63/061

*Primary Examiner* — Jacob B Meyer
(74) *Attorney, Agent, or Firm* — AVEK IP, LLC; Kent R. Erickson

(57) ABSTRACT

A trailer includes a trailer frame using suspension cables supported from vertically extending towers on opposite sides of the trailer frame and connected to distal ends of the trailer frame for supporting distal portions of the trailer frame. The trailer bed frame comprises a plurality of folding frame sections which can be unfolded into planar alignment to form the trailer frame and folded into an overlapping or stacked alignment for storage. Left and right wheels are rotatably mounted on left and right suspensions which are removably securable to left and right sides of the trailer frame. The suspensions may comprise quarter elliptical leaf spring suspensions.

18 Claims, 15 Drawing Sheets

(56) References Cited

U.S. PATENT DOCUMENTS

| | | | |
|---|---|---|---|
| 6,834,882 B1* | 12/2004 | Boyd | B60P 3/122 |
| | | | 280/789 |
| 7,073,816 B1 | 7/2006 | Larson et al. | |
| 7,281,728 B1 | 10/2007 | Wayrynen | |
| 7,537,219 B1 | 5/2009 | Sherwood | |
| 7,540,528 B2 | 6/2009 | Spainhower | |
| 7,543,842 B1* | 6/2009 | Fiorini | B62B 3/025 |
| | | | 280/43 |
| 7,891,697 B1 | 2/2011 | Fahrbach | |
| 7,909,355 B2 | 3/2011 | Thedford et al. | |
| 8,210,559 B2* | 7/2012 | Russell | B60D 1/14 |
| | | | 280/507 |
| 8,360,462 B2 | 1/2013 | Mayfield | |
| 8,696,012 B2 | 4/2014 | Oyasaeter | |
| 9,725,024 B1* | 8/2017 | Davis | B62D 63/061 |
| 9,932,078 B1 | 4/2018 | Nehring | |
| 10,081,402 B1* | 9/2018 | Davis | B60P 1/433 |
| 10,279,990 B2 | 5/2019 | Ronstadt | |
| 10,752,306 B2 | 8/2020 | Nordstrom | |
| 2002/0195798 A1* | 12/2002 | James | B62K 27/02 |
| | | | 280/656 |
| 2005/0093273 A1* | 5/2005 | McDonell | B62D 63/061 |
| | | | 280/656 |
| 2005/0184485 A1* | 8/2005 | Timmermans | B60D 1/027 |
| | | | 280/43.1 |
| 2006/0091646 A1* | 5/2006 | Steins | B62D 63/061 |
| | | | 280/656 |
| 2007/0018429 A1* | 1/2007 | Randall | B60D 1/54 |
| | | | 280/491.1 |
| 2007/0080508 A1 | 4/2007 | Owens et al. | |
| 2008/0157493 A1* | 7/2008 | McConkey | B62D 63/061 |
| | | | 280/40 |
| 2009/0007948 A1* | 1/2009 | Dempsey | B60P 3/341 |
| | | | 135/96 |
| 2009/0212515 A1 | 8/2009 | Oyasaeter | |
| 2009/0295192 A1* | 12/2009 | Hyde | B62D 63/061 |
| | | | 296/181.7 |
| 2009/0309330 A1* | 12/2009 | Ryan | B60D 1/46 |
| | | | 280/43.13 |
| 2010/0032918 A1* | 2/2010 | Chamoun | B62D 63/061 |
| | | | 280/30 |
| 2011/0121544 A1 | 5/2011 | Pearce | |
| 2011/0221168 A1* | 9/2011 | Alexander | B62D 63/061 |
| | | | 280/639 |
| 2011/0266776 A1* | 11/2011 | Kapels | B60D 1/52 |
| | | | 280/656 |
| 2012/0204360 A1* | 8/2012 | Chamoun | B62D 63/061 |
| | | | 14/71.3 |
| 2012/0313346 A1* | 12/2012 | Steins | B62D 63/061 |
| | | | 280/401 |
| 2014/0312593 A1* | 10/2014 | Bank | B62D 63/061 |
| | | | 280/400 |
| 2018/0215302 A1* | 8/2018 | Reid | B60P 1/14 |
| 2020/0346700 A1* | 11/2020 | Nordstrom | B60D 1/06 |
| 2021/0394843 A1* | 12/2021 | Taylor | B62D 63/062 |

\* cited by examiner

LIGHTWEIGHT TRAILER

CROSS-REFERENCE TO RELATED APPLICATIONS

This application claims the benefit of U.S. Provisional Patent Application No. 63/087,429, filed Oct. 5, 2020, U.S. Provisional Patent Application No. 63/062,787, filed Aug. 7, 2020, and U.S. Provisional Patent Application No. 62/936,074, filed Nov. 15, 2019, the disclosures of which are hereby incorporated herein in their entirety by reference.

BACKGROUND OF THE INVENTION

Field of the Invention

This invention relates to trailers and more specifically to a trailer frame construction for lightweight trailers including collapsible or foldable trailer frames to facilitate storage in a relatively small space when not in use.

Background of the Invention

Options for the owners of small passenger vehicles to haul material or equipment that exceeds the dimensions or capacity of the vehicle are limited and usually unsatisfactory. Small trailers have been developed for towing behind passenger vehicles, but they present storage problems for individuals living in apartments or condominiums or in communities with restrictions on parking trailers outside. Renting a trailer requires separate trips to a rental company to obtain and then return the trailer and is relatively expensive.

Folding trailers have been developed which can be folded for storage in a garage or shed, but such options typically are not available for apartment dwellers or individuals with limited extra garage storage space. The lightest commercially available trailer weight approximately 250 pounds. Existing folding trailers often require multiple tools to assemble and the purchaser to supply and attach a sheet of plywood to the trailer which increases its weight and requires tools to drive screws into a metal frame.

There remains a need for a folding trailer which will fold down small enough to fit within a closet, on a storage shelf or within the trunk or back seat of a passenger car. Such a trailer should preferably weigh less than 100 pounds and preferably less than 80 pounds so that most individuals can move the folded trailer for storage. Such a trailer should have a carrying capacity of at least 800 to 900 pounds.

SUMMARY OF THE INVENTION

The trailer of the present invention includes a trailer frame support assembly using a cable stayed design for supporting front and rear distal portions of the trailer bed frame using cables or other tension members extending upward from points of connection to the trailer bed frame to towers extending upward from the trailer bed frame and medially along the sides thereof. The trailer bed frame is preferably formed from folding frame sections which can be unfolded into planar alignment to form the trailer bed frame and folded into an overlapping or stacked alignment for storage. Left and right wheels are rotatably mounted on left and right suspensions which are removably securable to left and right sides of the trailer bed frame. The suspensions may comprise quarter elliptical leaf spring suspensions.

In one embodiment, the trailer bed frame includes left and right tension member supports or towers connected to and extending upward from the left and right sides respectively of the trailer bed frame medially between the respective front and rear ends of the left and right sides. A left, front tension member is supported at an inner end on the left tower in spaced relation above the trailer bed frame and a distal or forward end is connected to a left side of the trailer bed frame forward of the left tower. A left, rear tension member is supported at an inner end on the left tower in spaced relation above the trailer bed frame and a distal or rearward end is connected to a left side of the trailer bed frame rearward of the left tower. A right, front tension member is supported at an inner end on the right tower in spaced relation above the trailer bed frame and a distal or forward end is connected to a right side of the trailer bed frame forward of the right tower. A right, rear tension member is supported at an inner end on the right tower in spaced relation above the trailer bed frame and a distal or rearward end is connected to a right side of the trailer bed frame rearward of the right tower It is foreseen that the tension members may be formed from cables, straps, and ropes or the like. The left, front tension member and the left, rear tension member may be formed as single or unitary tension member. Similarly, the right, front tension member and the right, rear tension member may be formed as a right unitary tension member The left and right towers may be pivotally connected proximate lower ends thereof to the left and right sides of the trailer bed frame and pivotal between a retracted or stored position and an extended, deployed or use position. In the retracted position the left and right towers extend in parallel alignment adjacent the left and right sides respectively of the trailer bed frame. In the extended position the left and right towers extend transverse to the left and right sides of the trailer bed frame respectively and support a medial portion of the left and right unitary tension members respectively above the trailer bed frame.

It is foreseen that the trailer bed frame assembly may comprise two, three, four or more frame sections hingedly connected together and pivotal between folded and unfolded configuration. In the folded configuration the frame sections extend in overlapping alignment and in an unfolded configuration the frame sections extend in planar alignment. When the frame sections are positioned in the unfolded configuration, the trailer bed frame assembly has left and right sides each having front and rear ends. Left and right tension member support towers may be connected to the trailer bed frame assembly medially along the left and right sides respectively. The left and right towers support left and right tension members or tension member sections having distal ends connected to the left and right sides of the trailer bed frame assembly forward and rearward of the respective tower for supporting the trailer bed frame outward from the towers. In a preferred embodiment the distal ends of the tension members are connected to the distal ends of the sides of the trailer bed frame on which the tension members are supported.

A trailer tongue may be removably securable to the trailer bed frame. Similarly, wheel assemblies comprising left and right wheels, rotatably mounted on left and right suspensions may be removably securable to the left and right sides respectively of the trailer bed frame. In one embodiment each of the left and right suspensions comprises upper and lower leaf springs supported in spaced apart relation by a spacer secured between distal ends of the upper and lower leaf springs and a connector secured between inner ends of the upper and lower leaf springs. The connector has a connector portion extending past the inner ends of the upper and lower leaf springs. The connector portion is removably securable within a receiver formed in a respective left or right side of the frame assembly generally medially along the sides thereof. Each of the left and right wheels includes a spindle on which the left and right wheels are rotatably mounted with the spindle fixedly secured to the respective left or right suspension proximate a distal end thereof.

In one embodiment, the trailer bed frame is formed from a plurality of frame sections wherein each frame section can be folded relative to an adjacent frame section to facilitate storage. A sheet of fabric may be secured over each of the frame sections to form a trailer bed support surface. In a preferred embodiment, the sheets of fabric may be formed from a material having a high tensile strength to weight ratio such as Kevlar® fibers. Other sheet material including metal, fiberglass, plastic, composite or wood sheets including plywood or strand board may be used to form the trailer bed support surface.

In one embodiment, the trailer bed frame is formed from front and rear inner frame sections and front and rear outer frame sections. The front and rear inner frame sections are hingedly connected together by at least one hinge connected across laterally extending, adjacent inner edges of the front and rear inner frame sections and secured to upper surfaces of the front and rear inner frame sections such that upper surfaces of the front and rear inner frame sections are selectively pivotable toward each other. The front outer frame section is hingedly connected to the front inner frame section by at least one hinge connected across laterally extending, adjacent edges of the front outer frame section and the front inner frame section such that lower surfaces of the front outer frame section and the front inner frame section are pivotable toward each other. The rear outer frame section is hingedly connected to the rear inner frame section by at least one hinge connected across laterally extending, adjacent edges of the rear outer frame section and the rear inner frame section such that lower surfaces of the rear outer frame section and the rear inner frame section are pivotable toward each other.

DETAILED DESCRIPTION OF THE PREFERRED EMBODIMENTS

Figure 1:
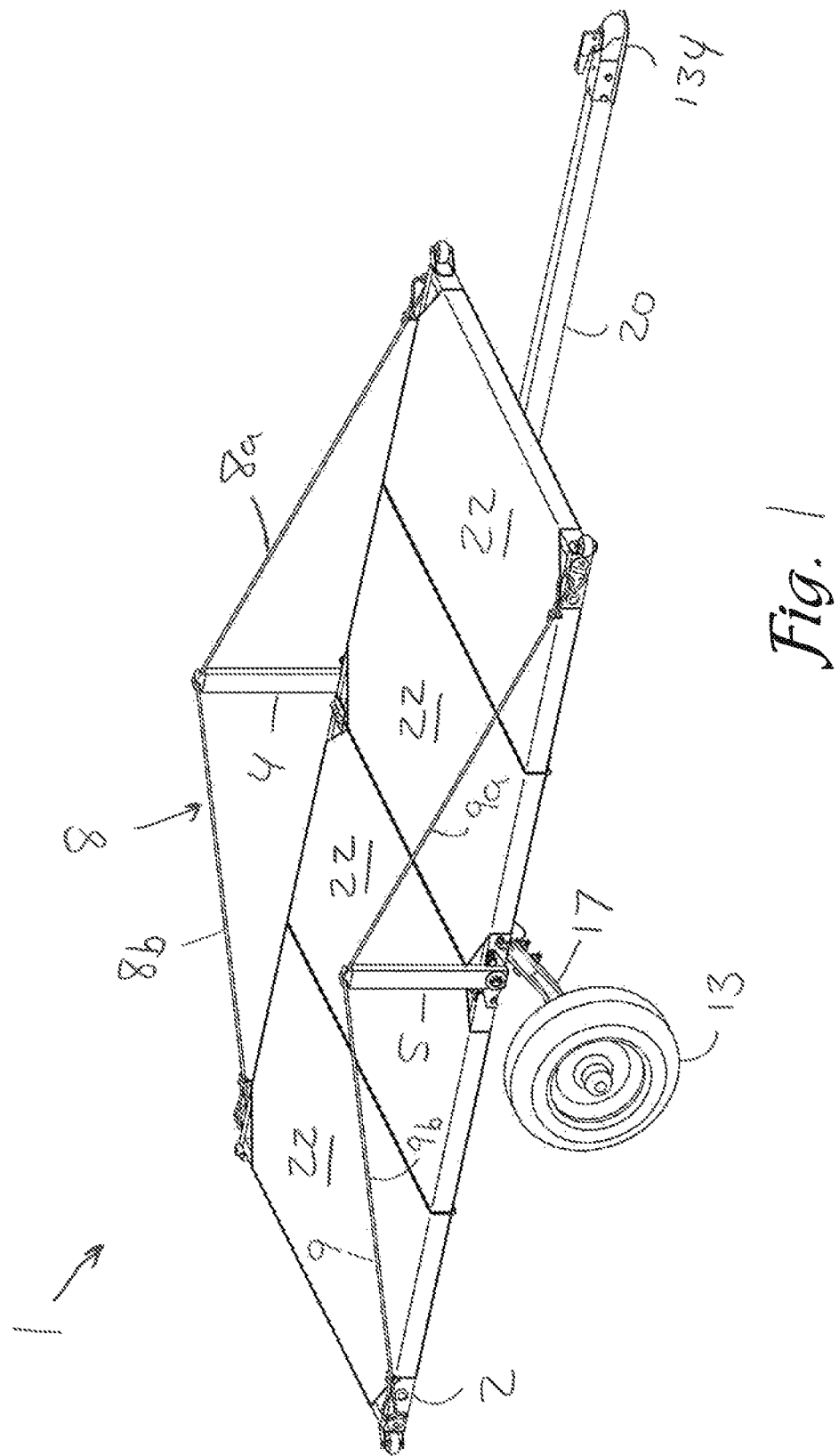
FIG. 1 is a perspective view of a foldaway trailer including a foldable trailer frame and a trailer frame support system including support cables each supported medially on a tower with opposite ends of each support cable connected to distal ends of the sides of the trailer frame.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 2:
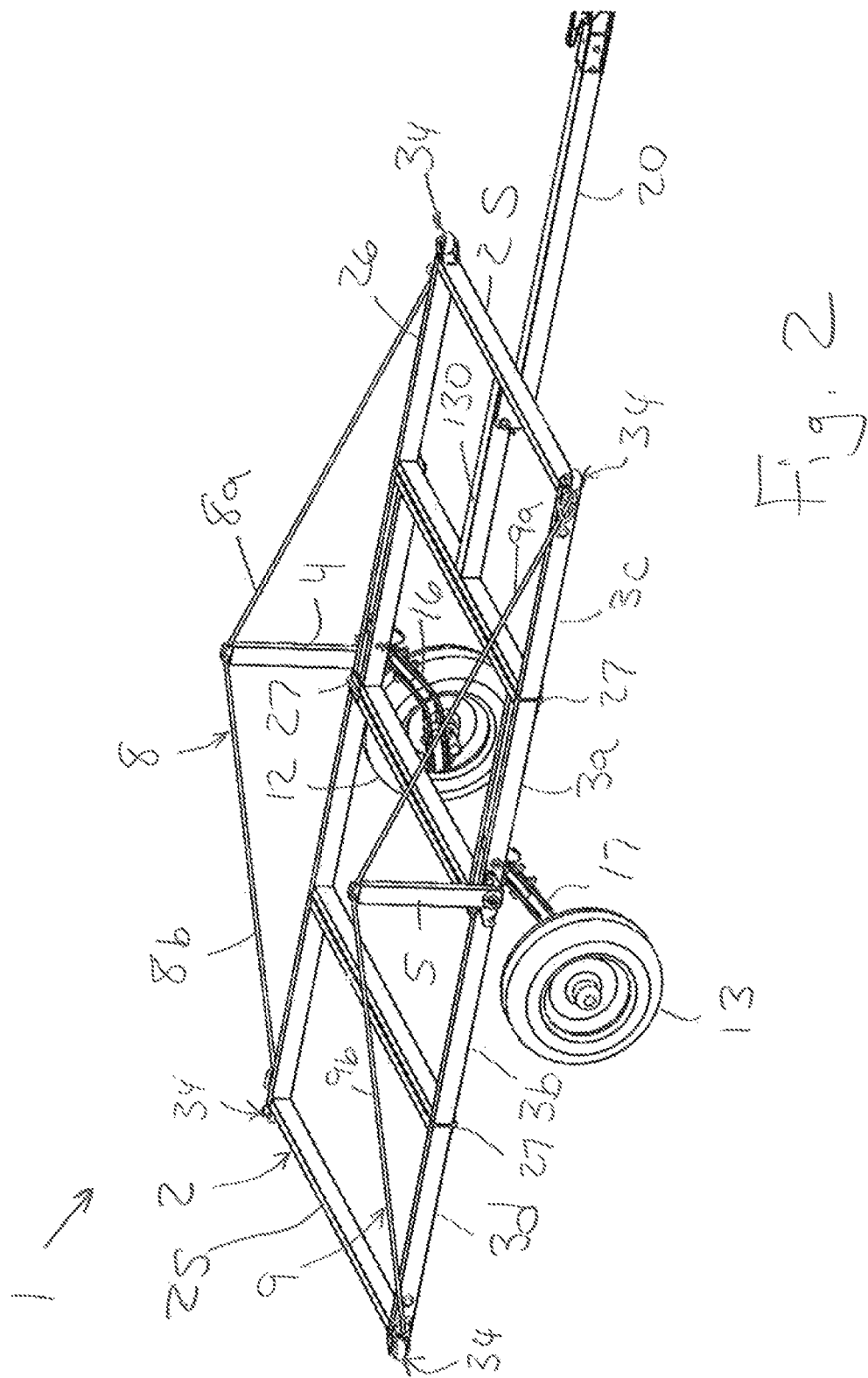
FIG. 2 is a perspective view of the foldaway trailer as shown in FIG. 1 with fabric covering folding frame sections removed to show the construction of the trailer frame.
Figure 3:
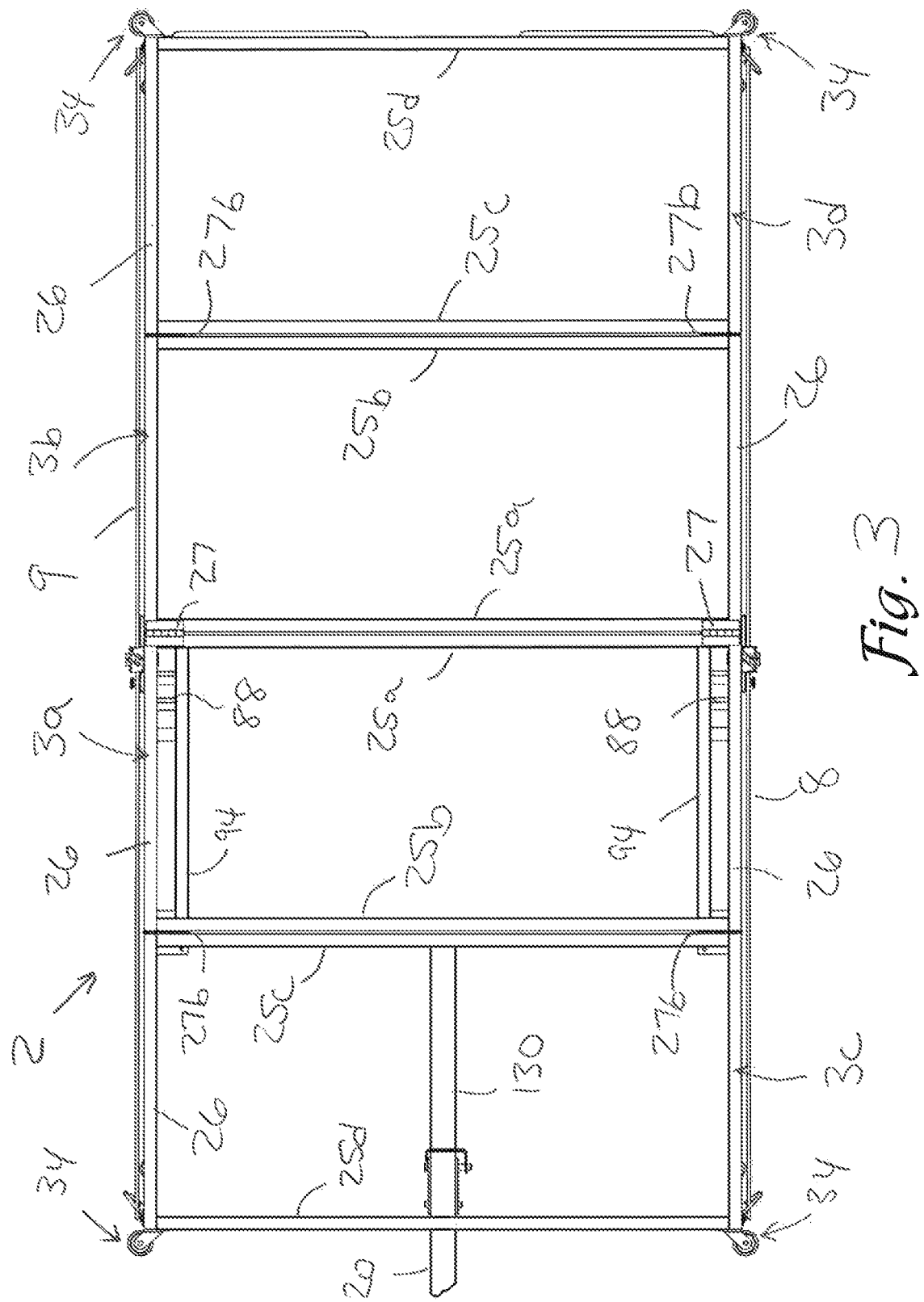
FIG. 3 is a top plan view of the trailer frame with the fabric covering the folding frame sections removed and wheel assemblies removed and a trailer tongue shown fragmentary.

A foldaway or collapsible trailer 1 is shown in FIGS. 1 and 2 in an unfolded, use configuration. The trailer 1 comprises a trailer bed frame assembly or trailer bed frame 2 formed from folding frame sections 3, left and right towers 4 and 5 for supporting left and right tension members 8 and 9, left and right wheel assemblies 12 and 13 supported on left and right suspensions 16 and 17 connected on opposite sides of one of the frame sections 3 and a tongue 20 removably connectable to one of the frame sections 3. In the embodiment as shown in FIG. 1, planar supports or trailer bed panels 22 formed from sheets of woven material having a high tensile strength to weight ratio such as Kevlar® fibers are secured to and cover each frame section 3 to form a support surface 23 for supporting materials to be hauled using the trailer 1. The planar supports 22 are shown removed in FIG. 2. The trailer bed frame assembly 3 in combination with the planar supports 22 form a trailer bed 24. It is foreseen that a wide variety of materials could be used to form the planar supports including aluminum panels, wood panels. It is also foreseen that the trailer 1 could be used to haul items without adding bed panels 22 to the frame sections 3. Similarly, a variety of other support structures could be removably or fixedly secured to the frame sections 3 configures to support specifically shaped items on the trailer. As used herein, references to left and right refer to the side of the trailer corresponding to the side of a driver facing forward in the driver's seat of a vehicle towing the trailer. The front or forward end of the trailer is the end of the trailer bed frame 2 to which the tongue 20 is connected and which is positioned closest to the towing vehicle.

In the embodiment shown in FIGS. 1 and 2, the trailer bed 3 is formed from four rectangular frame sections 3a-3d including two center frame sections 3a and 3b and two outer or front and rear frame sections 3c and 3d. Each frame section 3a-3d is similarly sized and in one embodiment may be formed from square or rectangular aluminum tubing. It is foreseen that the tubing or frame members used could be formed from other metals, fiberglass or wood or other rigid materials. More specifically, each frame section 3 is formed from a pair of lateral frame members 25 and a pair of side frame members 26.

Figure 7:
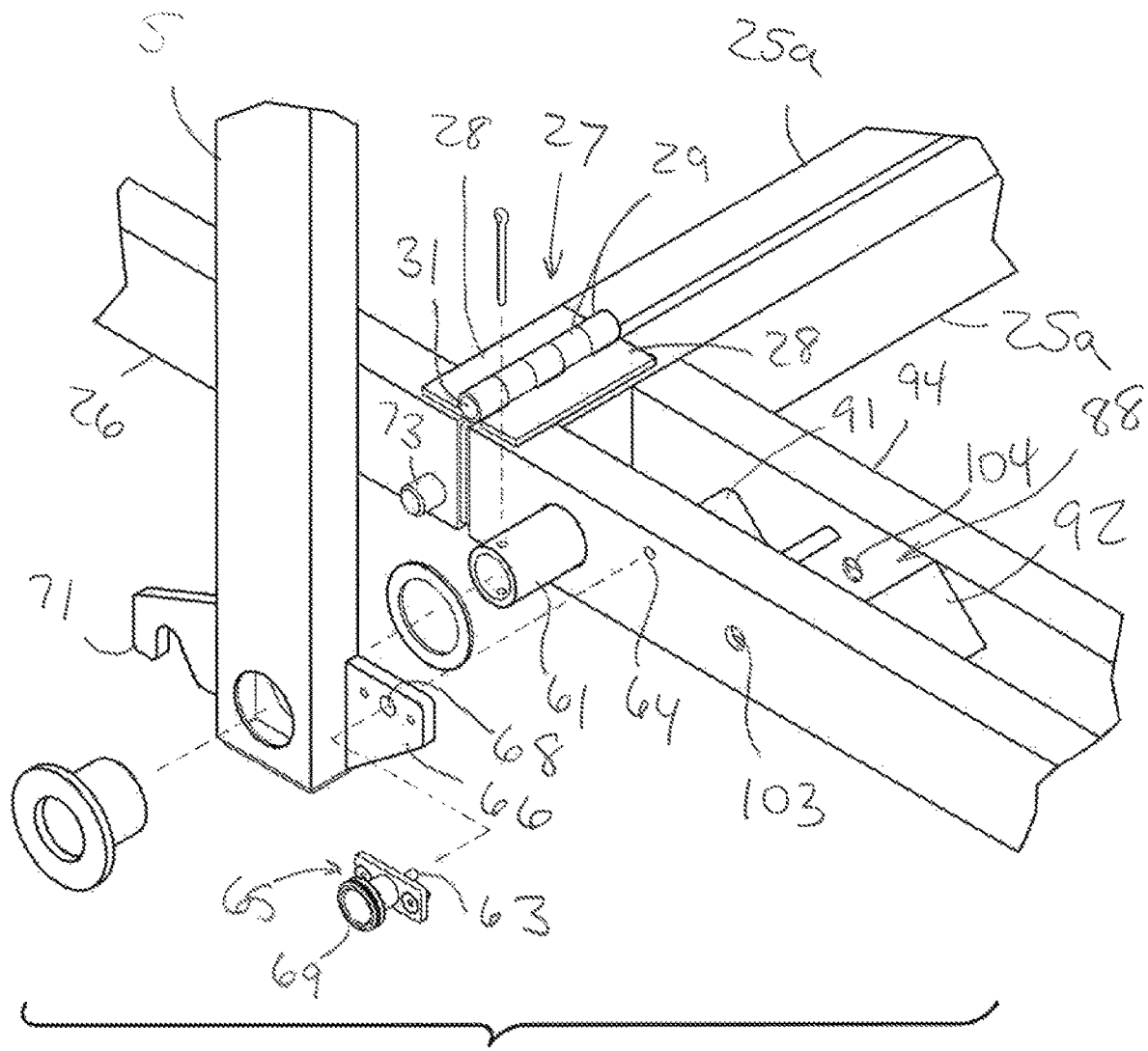
FIG. 7 is a greatly enlarged, exploded and fragmentary view of the base of the tower as shown in FIG. 5 showing a pivotal connection between the tower and the trailer frame and a locking mechanism for releasably securing the tower in a vertical orientation.

In the embodiment shown, each frame section 3 is wider in a lateral direction than it is long. Adjacent frame sections 3a-3d are connected together by hinges 27. As best seen in FIG. 7, hinges 27 may be the type having a pair of leaves 28 extending adjacent one another and having intermeshed and aligned knuckles 29 through which a hinge pin 31 extends to pivotally connect the leaves 28 together. It is also foreseen that the hinges may be in the nature of living hinges formed by a section or sheet of fabric extending between adjacent frame sections. For example, if a single sheet of fabric is used to form the planar support 22 of at least two adjacent frame sections 3, the portion of the sheet of fabric extending across the narrow space between the two adjacent frame sections 3 could function as a living hinge for the two frame sections 3.

In the embodiment shown, the two center frame sections 3a and 3b are connected together by hinges 27a mounted between and across upper surfaces of adjacent, inner lateral frame members 25a of the frame sections 3a and 3b. As generally seen in FIGS. 8A-8F and FIG. 3, the two outer frame sections 3c and 3d are connected to the two inner frame sections 3a and 3b respectively by hinges 27b mounted between and across lower surfaces of adjacent lateral frame members 25b and 25c of the frame sections 3a and 3b and the frame sections and 3c and 3d respectively. As seen in FIGS. 8D-8F, the center frame sections 3a and 3b connected by hinges 27a pivot upward so that the outer lateral frame members 25b pivot inward and upward toward each other. The outer frame sections 3c and 3d pivot downward about hinges 27b and relative to the center frame sections 3a and 3b respectively to which they are attached so that the outer frame sections 3c and 3d can be pivoted against and adjacent the inner frame sections 3a and 3b respectively. The hinged connections allow the four rectangular frame sections 3 to be stacked in adjacent or generally, parallel planar relationship as shown in FIG. 8F.

Roller assemblies 34, comprising a roller 35 mounted on a roller fork 36 are mounted on opposite ends of the outer lateral frame members 25d of the outer frame sections 3c and 3d proximate each corner thereof. When the outer frame sections 3c and 3d are folded against the inner frame sections 3a and 3b as shown in FIG. 8F, the rollers 35 are all oriented in the same general direction for supporting the folded trailer frame 2 on a surface to permit rolling the folded trailer frame 2 into and out of a storage location. One or more handles (not shown) may be connected to one or more of the frame sections 3 to facilitate lifting or moving of the folded frame sections 3. The handles can take a variety of forms including strap type handles connected to the side frame members 26 of inner frame sections 3a and 3b on one side thereof. A securement strap (not shown) may also be connectable between frame sections 3 such as outer frame sections 3c and 3d to hold and retain the frame sections 3a-3d in a folded configuration. It is foreseen that the securement strap could also function as the handle.

Figure 4:
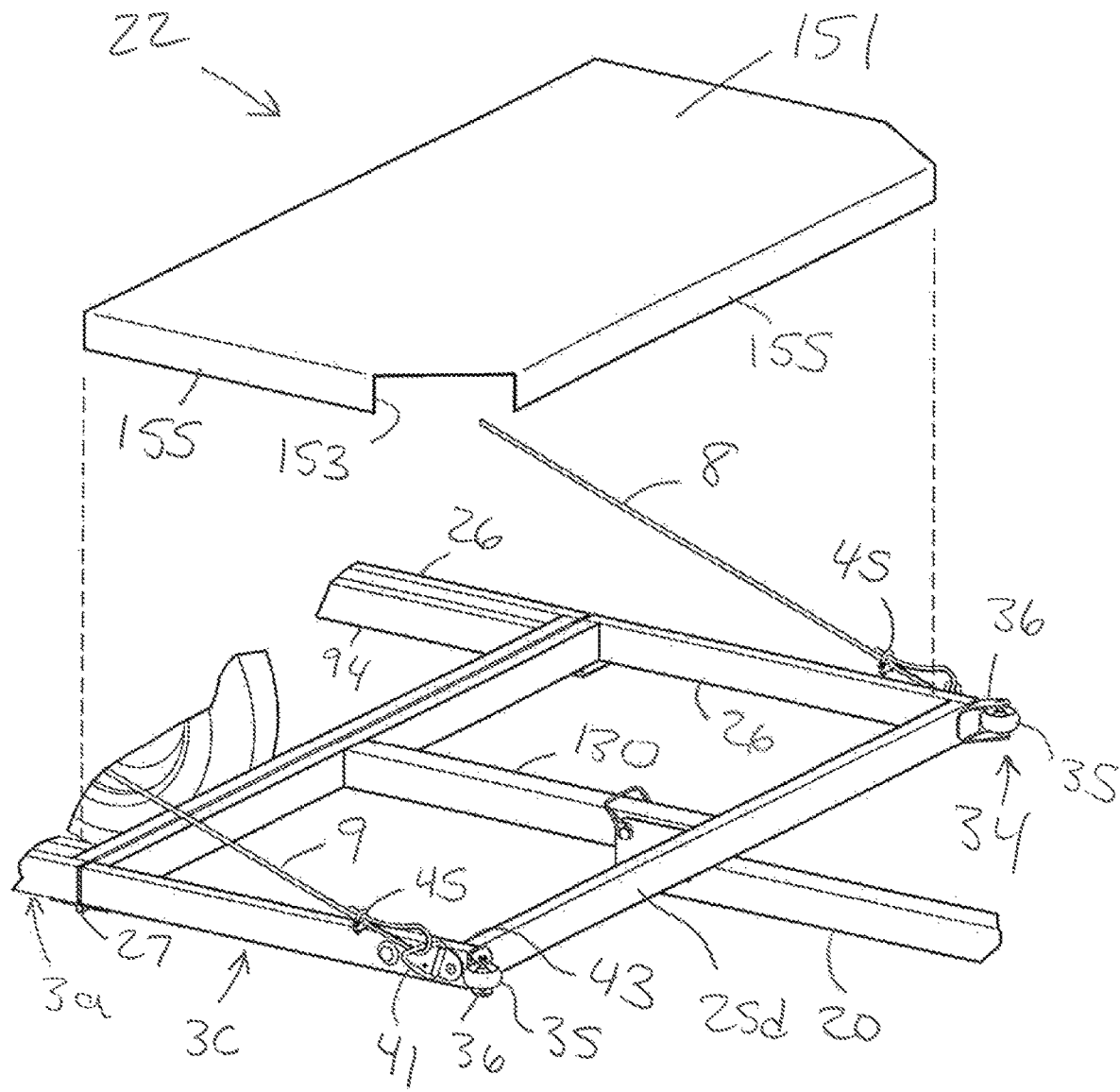
FIG. 4 is a fragmentary, perspective view of the trailer frame showing the fabric covering exploded away from a front, outer frame section.

In the embodiment shown, the left and right tension members 8 and 9 are each formed from a single, continuous or unitary tension member such as a cable, cord or strap connected at opposite ends to outer ends of the outer frame sections 3c and 3d. In the embodiment shown, and as best seen in FIG. 4, connection rings 41 are pivotally connected to side frame members 26 of the outer frame sections 3c and 3d proximate the outer or distal corners 43 thereof formed between the side frame members 26 and the outermost lateral frame members 25d of the outer frame sections 3c and 3d. Distal ends of each tension member 8 and 9 may be connected to the rings 41 by a variety of means including forming a loop in the distal ends of the tension members 8 and 9 around the rings 41 and securing the free ends of the tension members 8 and 9 with clamps 45 as shown in FIG. 4, or using hooks connected to the ends of the tension members 8 and 9.

Each of the left and right towers or tension member supports 4 and 5 is movable, deployable or pivotable between a retracted or stored position and an extended position. In the embodiment shown, in the retracted position, the towers 4 and 5 each extend parallel to an adjacent side frame member 26 of inner frame section 3a and in an extended position the towers 4 and 5 each extend perpendicular to the adjacent side frame members 26 of inner frame section 3a. When the towers 4 and 5 are in the retracted positions, the tension members 8 and 9 extend loosely between the connection rings 41 on opposite ends of the frame sections 3c and 3d. Pivoting the towers 4 and 5 to extended positions with the upper end of each tower sliding under a respective tension member 8 or 9 takes up the slack and places the tension members 8 and 9 under tension such that distal ends of the tension member 8 and 9 support the side frame members 26 of the outer frame sections 3c and 3d proximate the corners 43 thereof. It is foreseen that rings 41 could be secured to the respective side frame members 26 closer to the towers 4 and 5 so that the distal ends of the tension members 39 would be secured to the side frame members 26 closer to the towers 4 and 5 and in inwardly spaced relation from the corners 43 formed between the side frame members 26 and the outermost lateral frame members 25d of frame sections 3c and 3d.

Figure 6:
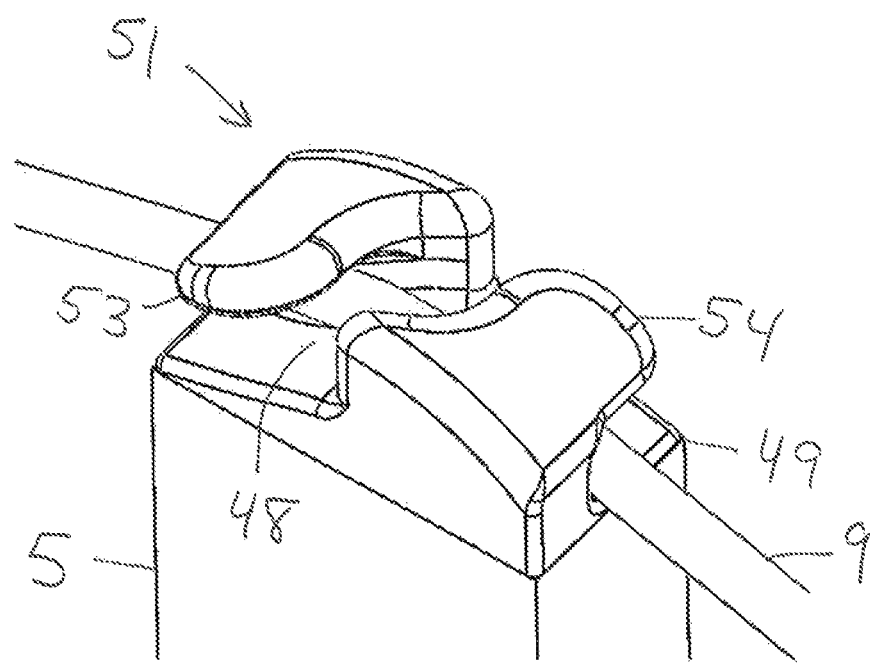
FIG. 6 is a greatly enlarged and fragmentary view of the upper end of the tower as shown in FIG. 5.

Referring to FIG. 6, glide surfaces 48 are formed on or proximate the distal ends 49 of each of the towers 4 and 5. The glide surfaces 48 are preferably curved and shaped to allow the corresponding tension member 8 and 9 to slide relative to the associated glide surface or channel 48. A tension member retainer or retainer assembly 51 is formed on or connected to the distal end 49 of each tower 4 and 5 to hold the respective tension member 8 or 9 in alignment with and in close proximity to or against the glide surface 48 of the respective tower 4 or 5. In the embodiment shown, the tension member retainer assembly 51 on each tower 4 and 5 comprises two opposingly oriented hooks 53 and 54 extending in adjacent relationship with each other and in overlapping and spaced relation above the glide surface or channel 48 with a slot 55 formed between the hooks 53 and 54 so that, when the towers 4 and 5 are pivoted out of the vertical alignment to provide slack in the tension members 8 and 9 respectively, the tension member 8 or 9 may be inserted through the respective slot 55 and past the hooks 53 and 54 and into the guide channel 48 of the respective tower 4 and 5. It is foreseen that the tension member retainer 51 for each tower 4 and 5 could comprise a cap securable across and between sidewalls to form an open ended cover above the glide surface 48 of each tower 4 and 5.

It is also foreseen that the left and right tension members 8 and 9 could be formed from or comprise two separate sections or lengths. In such an embodiment, not shown, an inner end of a left, front tension member 8a would be supported on or connected to the left tower 4 and a distal or forward end of the left, front tension member 8a would be connected to the connection ring 41 on the left side frame member 26 of front outer frame section 3c and forward of the left tower 4. An inner end of a left, rear tension member 8b would be supported on or connected to the left tower 4 and a distal or rear end of the left, rear tension member 8b would be connected to the connection ring 41 on the left side frame member 26 of rear outer frame section 3d and rearward of the left tower 4. An inner end of a right, front tension member 9a would be supported on or connected to the right tower 5 and a distal or forward end of the right, front tension member 9a would be connected to the connection ring 41 on the right side frame member 26 of front outer frame section 3c and forward of the right tower 5. An inner end of a right, rear tension member 9b would be supported on or connected to the right tower 5 and a distal or rear end of the right, rear tension member 9b would be connected to the connection ring 41 on the right side frame member 26 of rear outer frame section 3d and rearward of the right tower 5.

Figure 5:
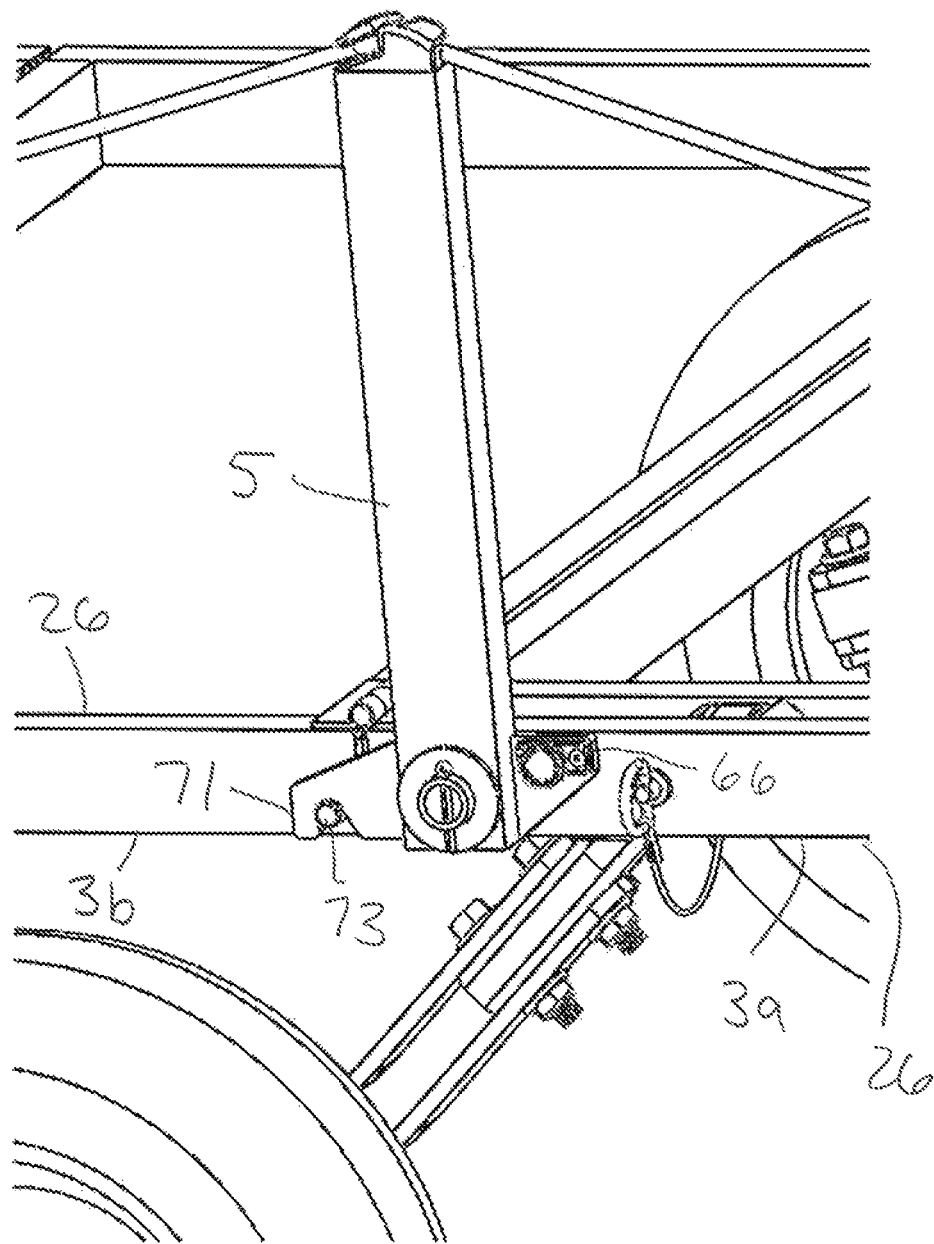
FIG. 5 is an enlarged and fragmentary view of the foldaway trailer as in FIG. 2 showing details of the tower on the right side of the trailer frame.

In the embodiment shown, and as best seen in FIGS. 5 and 7, each tower 4 and 5 is pivotally mounted on a pivot member or pin 61 at a lower end to a side frame member 26 of frame section 3a, in close proximity to the side frame member 26 of frame section 3b. Each tower 4 and 5 may be described as being pivotally mounted medially between front and rear ends of the sides of the trailer bed frame assembly 3. The towers 4 and 5 are securable in an extended position, perpendicular to side frame member 26 by a latch pin 63 extending into a latch pin hole 64 formed in the side frame member 26. The latch pin 63 is incorporated into a latch pin assembly 65 mounted on a latch pin mounting plate 66 connected to a lower end of a respective tower 4 or 5 and projecting away from the frame section 3b when the tower 4 or 5 is in the extended position. A pass-through hole 68 is formed in the latch pin mounting plate 66 and aligns with the latch pin hole 64 in side frame member 26 when the tower 4 or 5 to which the mounting plate 66 is attached is pivoted to the extended position. The latch pin assembly 65 is mounted on the latch pin mounting plate 66 with the latch pin 63 aligned with the pass-through hole 68. The latch pin 63 is spring biased within latch pin assembly 65 to extend through the pass-through hole 68 toward the side frame member 26 and into the latch pin hole 64 when aligned therewith. A knob 69 on the distal end of the latch pin 63 may be grasped by a user to pull the latch pin 63 out of the latch pin hole 64 in the side frame member 26 to allow the tower 4 or 5 to be rotated relative to the side frame member 26.

A downwardly opening hook 71 is connected to a lower end of each tower 4 and 5 on a side opposite the latch pin mounting plate 66. When the towers 4 and 5 are pivoted to the extended position and the frame sections 3a and 3b extend in planar alignment, the hook 71 extends across an end of the adjacent side frame member 26 of frame section 3b and engages a fixed pin 73 projecting outward therefrom. With the towers 4 and 5 secured in the extended position by latch pin 63 extending in the aligned latch pin hole 64 in the side frame member 26, the extension of the downward opening hook 71 over the fixed pin 73 prevents the frame section 3b from pivoting out of planar alignment with frame section 3a about hinges 27.

Figure 8A:
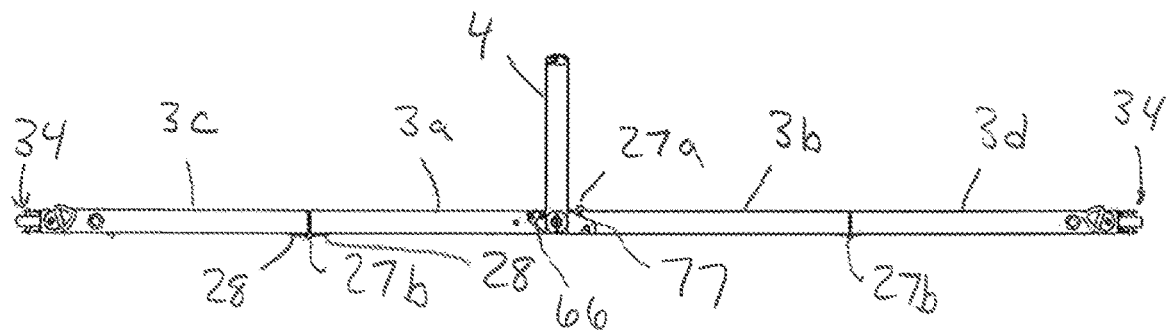
FIGS. 8A-8F are side views of the trailer frame assembly with FIGS. 8A-8C showing the frame sections in an unfolded configuration and the left tower being folded from a vertical to a horizontal alignment and FIGS. 8D-8F showing folding of the frame sections to a folded configuration.
Figure 8B:
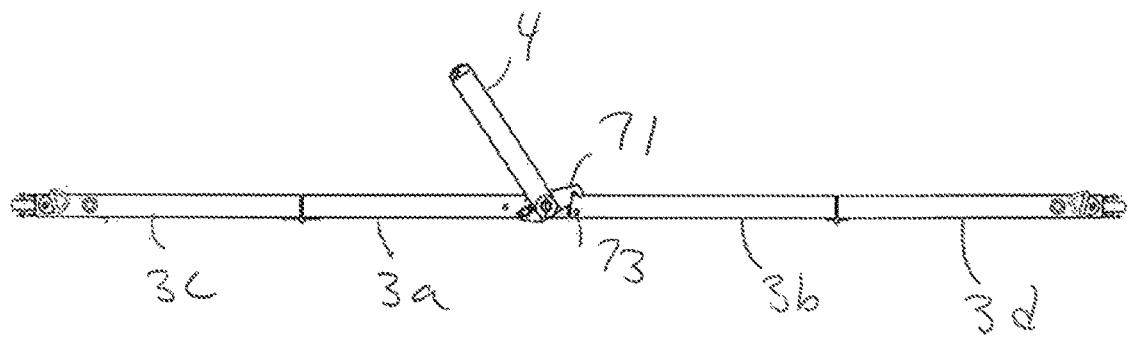
Figure 8C:
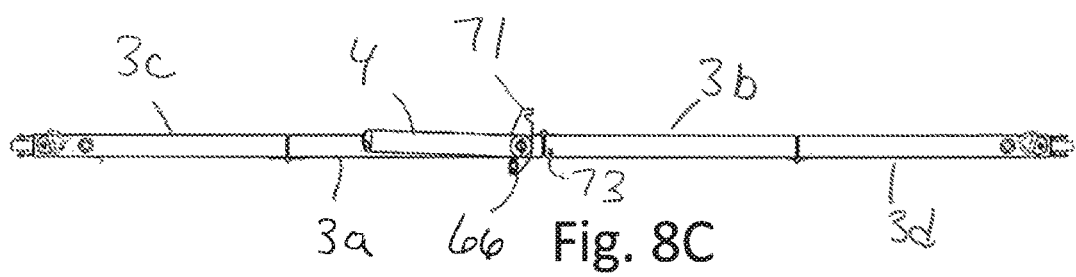
Figure 8D:
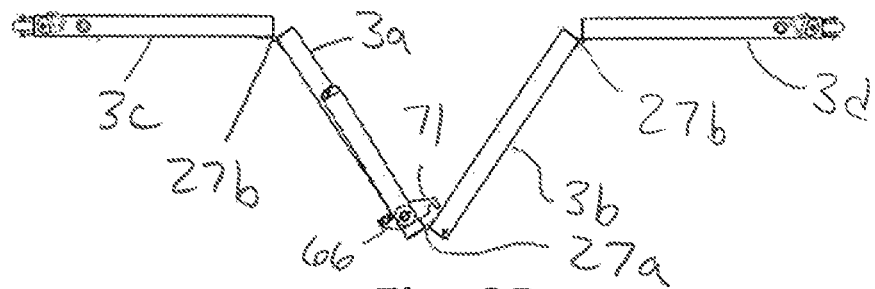
Figure 8E:
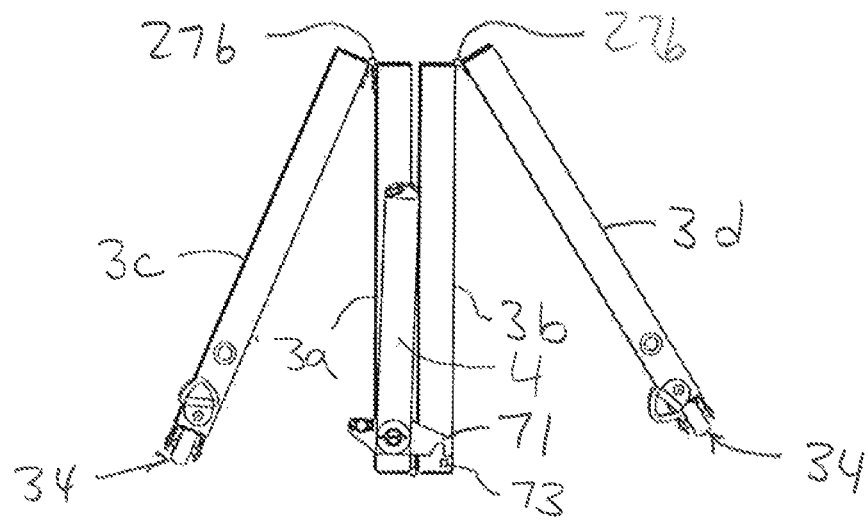
Figure 8F:
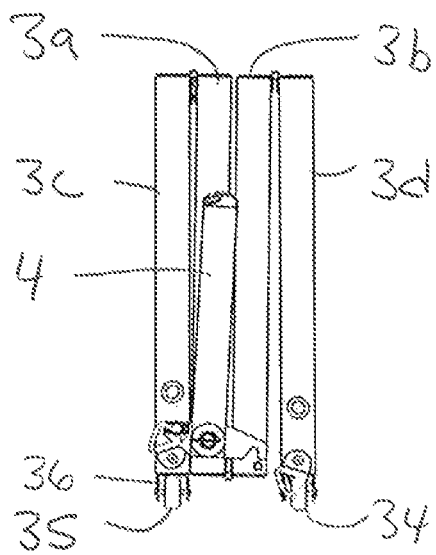
Figure 9:
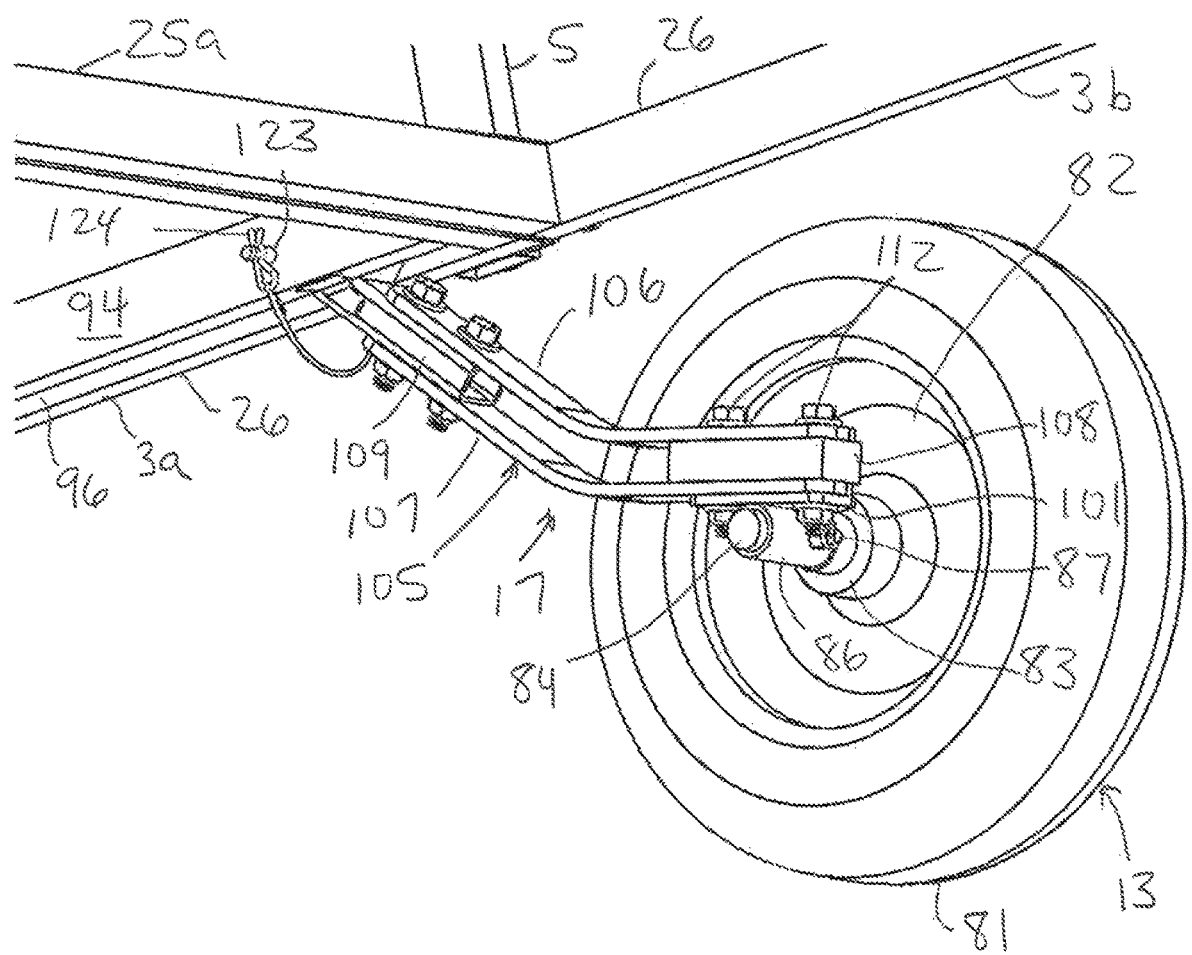
FIG. 9 comprises an enlarged and fragmentary, rear perspective view of a right side of the trailer frame showing details of the right wheel assembly and the right suspension connected to the right side of the trailer frame.

FIGS. 8A-8F show the folding of the frame sections 3a-3d from a planar alignment as shown in FIGS. 8A-8C to a folded, storage alignment as shown in FIG. 8F. The tension members 8 and 9 are not shown in FIGS. 8A-8F. To fold the frame sections 3a-3d, the left and right wheel assemblies 12 and 13, left and right suspensions 16 and 17 and tongue 20 must first be removed from the frame sections 3 as discussed in more detail hereafter and are not shown in FIGS. 8A-8F. The latch pins 63 securing the towers 4 and 5 in the extended position are disengaged from the side frame members 26 of the frame section 3a and the towers 4 and 5 are pivoted to the retracted position as shown in FIG. 8C. FIG. 8B shows tower 5 pivoted partially between the extended and retracted position. The inner frame sections 3a and 3b can then be pivoted toward each other and about hinges 27a as shown in FIG. 8D. Lower surfaces of the outer frame sections 3c and 3d can then be pivoted toward the lower surfaces of the inner frame sections 3a and 3b respectively by pivoting outer frame sections 3c and 3d about hinges 27 b as shown in FIG. 8E and until the frame sections 3a-3d are positioned in adjacent, overlapping alignment as shown in FIG. 8F.

It is foreseen that the direction of folding of the frame sections 3a-3d could be reversed. In the embodiment shown, when folding the frame sections to the folded configuration, upper surfaces of the inner frame sections 3a and 3b are pivoted towards each other and lower surfaces of the outer frame sections 3c and 3d are pivoted toward lower surfaces of the inner frame sections 3a and 3b respectively. As used herein, the upper and lower surfaces of the frame sections 3a-3d may be referred to as first and second vertically oriented faces. If, in a specific embodiment, the first vertically oriented faces face upward, then the second vertically oriented faces will face downward and vice versa.

FIGS. 9-13 show details of the right suspension 17 and the right wheel assembly 13 with the left suspension 16 and left wheel assembly 12 being mirror images thereof. The left and right suspensions 16 and 17 comprise a suspension assembly for securing the left and right wheel assemblies 12 and 13 to the frame assembly. Each wheel assembly 12 and 13 includes a tire 81 mounted on a wheel 82 having a bearing 83 to which a spindle 84 is rotatably connected. The spindle 84 is received within a sleeve 86 mounted on a respective suspension 16 or 17 and bolted thereto using bolt 87 extending through aligned bores in spindle 84 and sleeve 86.

In the embodiment shown, each suspension 16 and 17 comprises a quarter elliptical suspension and is removably securable to a respective side frame member 26 of inner frame section 3a in close proximity to the inner lateral frame member 25a thereof. Suspension receivers 88 are formed on each of the side frame members 26 of inner frame section 3a. Each suspension receiver 88 is formed by a pair of braces 91 and 92, which in the embodiment shown are formed from angle members, such as aluminum angles, welded or otherwise secured in spaced apart relation between an inner surface of the respective side frame member 26 and an inner surface of a support bar 94 extending in parallel and inwardly spaced relation from the respective side frame member 26 to form a gap 96 therebetween. Distal ends of each support bar 94 are secured to the lateral frame members 25 of the inner frame section 3a. The braces 91 and 92 are oriented with adjacent legs 98 thereof each extending at an acute angle relative to the bottom of the side frame member 26 which may be in the range of approximately thirty to sixty degrees. A suspension receiving channel 101 is formed between the adjacent legs 98 of the braces 91 and 92 with channel 101 extending away from the inner lateral frame member 25a at an acute angle of approximately forty-five degrees relative to horizontal as it extends from a lower end to an upper end of the respective side frame member 26. Pin receiving holes 103 and 104 are formed in lateral alignment through each of the side frame members 26 and the adjacent support bar 94 between the adjacent legs 98 of the braces 91 and 92 connected therebetween.

Each suspension 16 and 17 is formed as a leaf spring assembly 105 comprising upper and lower leaf springs 106 and 107 supported in spaced apart relationship by a spacer block 108 and a suspension connector 109. The leaf springs 106 and 107 may be formed from a variety of materials including spring steel or other material such as fiberglass or a composite material. The upper and lower leaf springs 106 and 107 are connected at distal ends to the spacer block 108 and at inner ends to the suspension connector 109. The suspension connector functions as a spacer for the leaf springs 106 and 107 at the inner ends thereof. In the embodiment shown, the leaf springs 106 and 107 may be described as extending at an upwardly oriented obtuse angle or as forming an upwardly curved, quarter ellipse.

Figure 10:
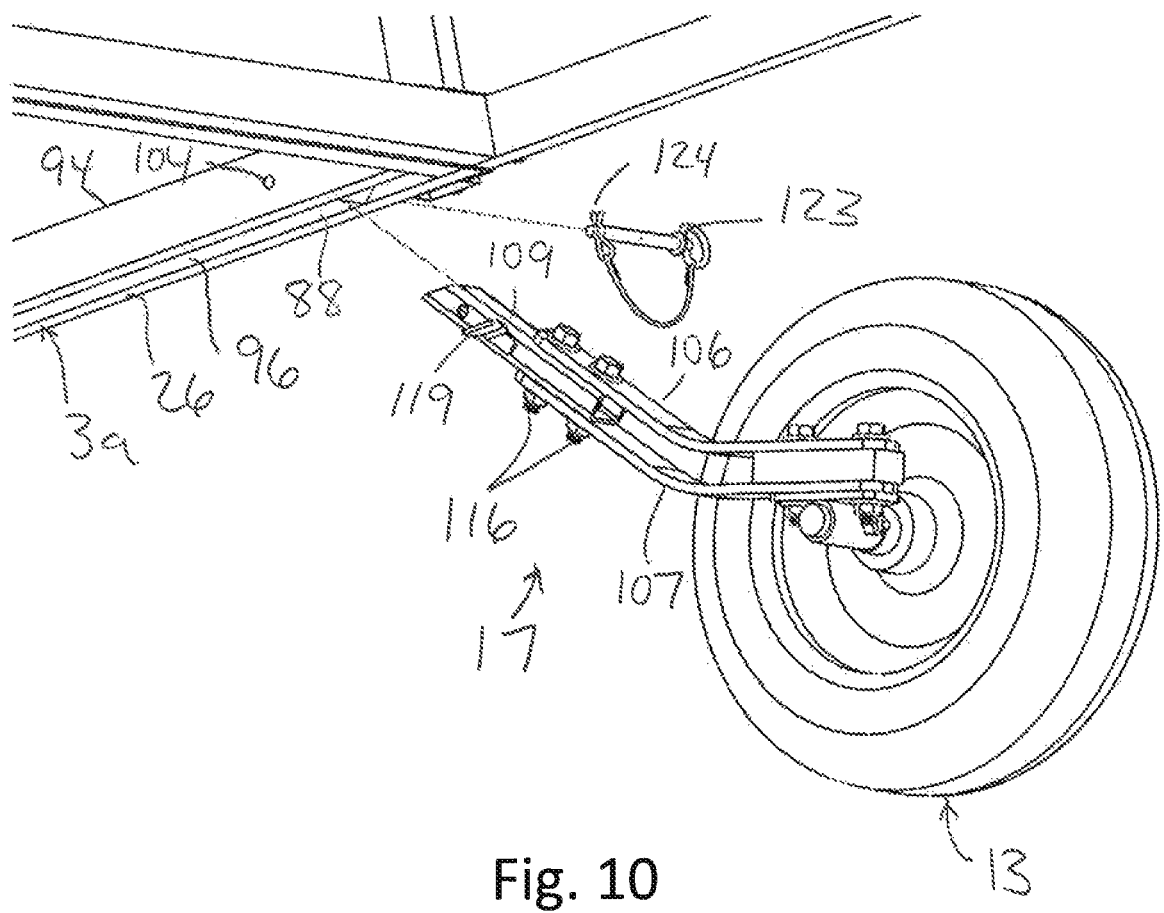
FIG. 10 is a fragmentary and exploded view, similar to FIG. 9, showing the right suspension and right wheel separated from the right side of the trailer frame.
Figure 11:
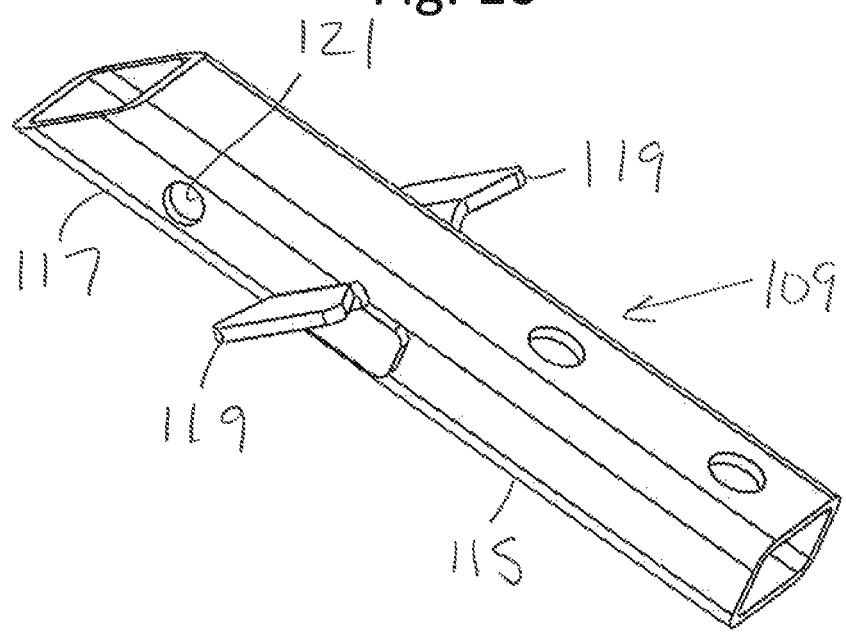
FIG. 11 is a perspective view of a connector of the right wheel suspension as shown in FIG. 10.
Figure 12:
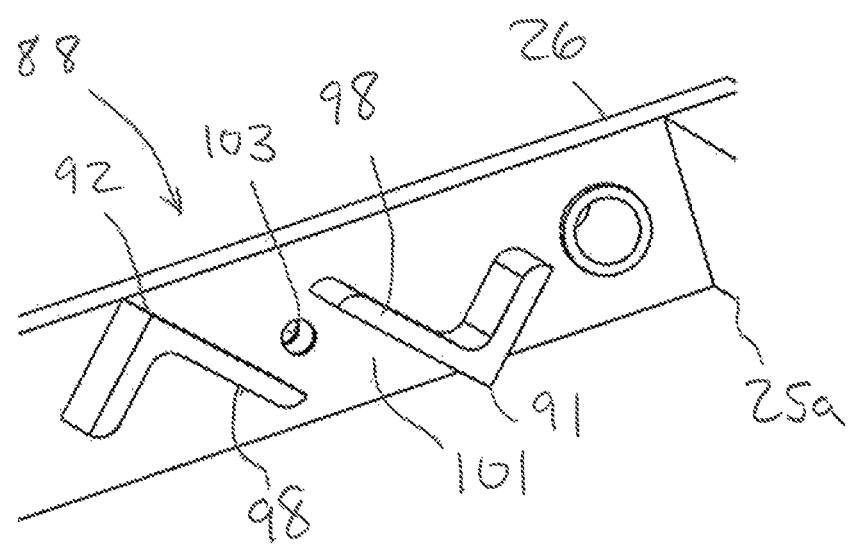
FIG. 12 is a fragmentary, perspective view of the right side of the trailer frame with portions removed to show a receiver formed from angle braces to receive a connector portion of the right suspension.
Figure 13:
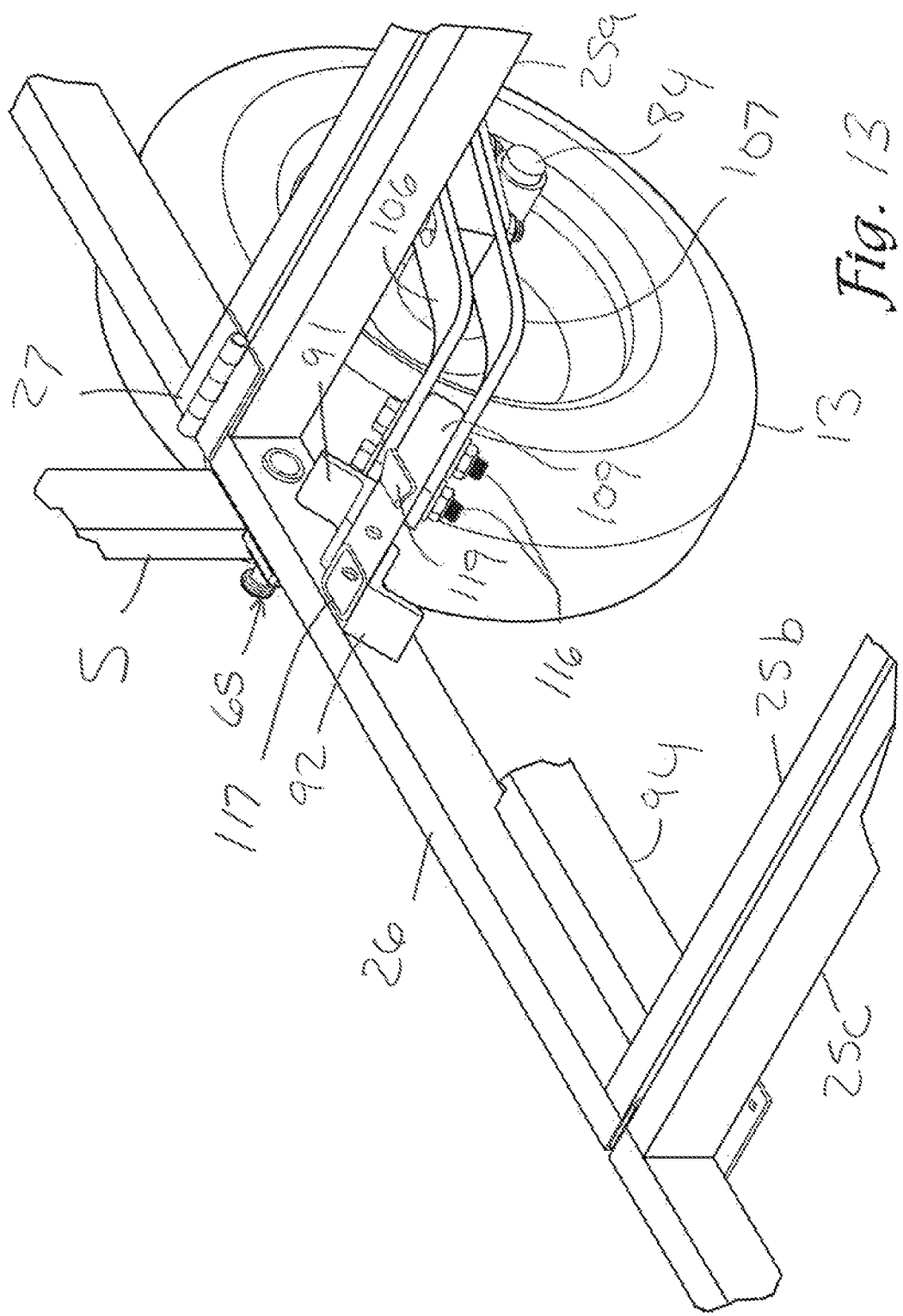
FIG. 13 is a fragmentary perspective view of the right side of the trailer frame with portions removed to show the connector portion of the right suspension inserted into the receiver.

The bearing sleeve 86 of each wheel assembly 12 and 13 is welded to a bearing mounting plate 101 that is bolted to the distal end of the lower leaf spring 107 by bolts 112 extending through the distal end of the upper leaf spring 106, the spacer block 108 the distal end of the lower leaf spring 107 and the bearing mounting plate 111. In the embodiment shown, and as best seen in FIGS. 10 and 11, each suspension connector 109 is formed from a rectangular tube having a first portion 115 bolted between the upper and lower leaf springs 106 and 107 by bolts 116 and a second or connection portion 117 projecting past the inner ends of the upper and lower leaf springs 106 and 107. The distal end of the connection portion 117 of suspension connector 109 is cut at an angle to match the angle of the receiver 88 formed by the legs 98 of braces 91 and 92 so that the distal end of the connection portion 117 extends parallel to and not above the upper surface of the side frame member 26 and support bar 94 between which it extends. Flange plates 119 are welded onto the opposite sides of the connection portion 117 of suspension connector 109 at angle relative to a longitudinal axis through the connection portion 117 corresponding to the angle of the legs 98 of braces 91 and 92 relative to the bottom of the side frame member 26 and support bar 94 such that the flange plates 119 extend generally parallel with the distal end of the suspension connector 109. A pin receiving hole 121 is formed through the connection portion 117 of the suspension connector 109 between the flange plates 119 and the distal end thereof.

The adjacent legs 98 of the angles irons 91 and 92 are spaced apart a distance just slightly wider than the thickness of the connection portion 117 of the suspension connector 109 which can be inserted therebetween from below the respective side frame member 26 to which the suspension 16 or 17 is to be connected. The pin receiving hole 121 through the connection portion 117 of suspension connector 109 is spaced from the flange plates 119 so that when the connection portion 117 is inserted in the suspension receiving channel 101 until the flange plates 119 abut against lower surfaces of the respective side frame member 26 and associated support bar 94, the pin receiving hole 121 through the connection portion 117 is aligned with the pin receiving holes 103 and 104 through the side frame member 26 and support bar 94 respectively. A latch pin 123 is removably insertable through the aligned holes 121 and 103 to connect the suspension 16 or 17 to the respective suspension receiver 88 and a hair pin 124 may be connected to the latch pin 123 to prevent its removal from the aligned holes 121, 103 and 104.

The left and right suspensions 16 and 17 are connected to the suspension receivers 88 on the respective side frame members 26 of the inner frame section 3a so that the suspensions extend downward, rearward and under the respective side frame members 26 of the inner frame section 3b which extends rearward of inner frame section 3a. The left and right wheel assemblies 12 and 13 are mounted on the left and right suspensions 16 and 17 to be rotatably supported laterally outward therefrom.

Figure 14:
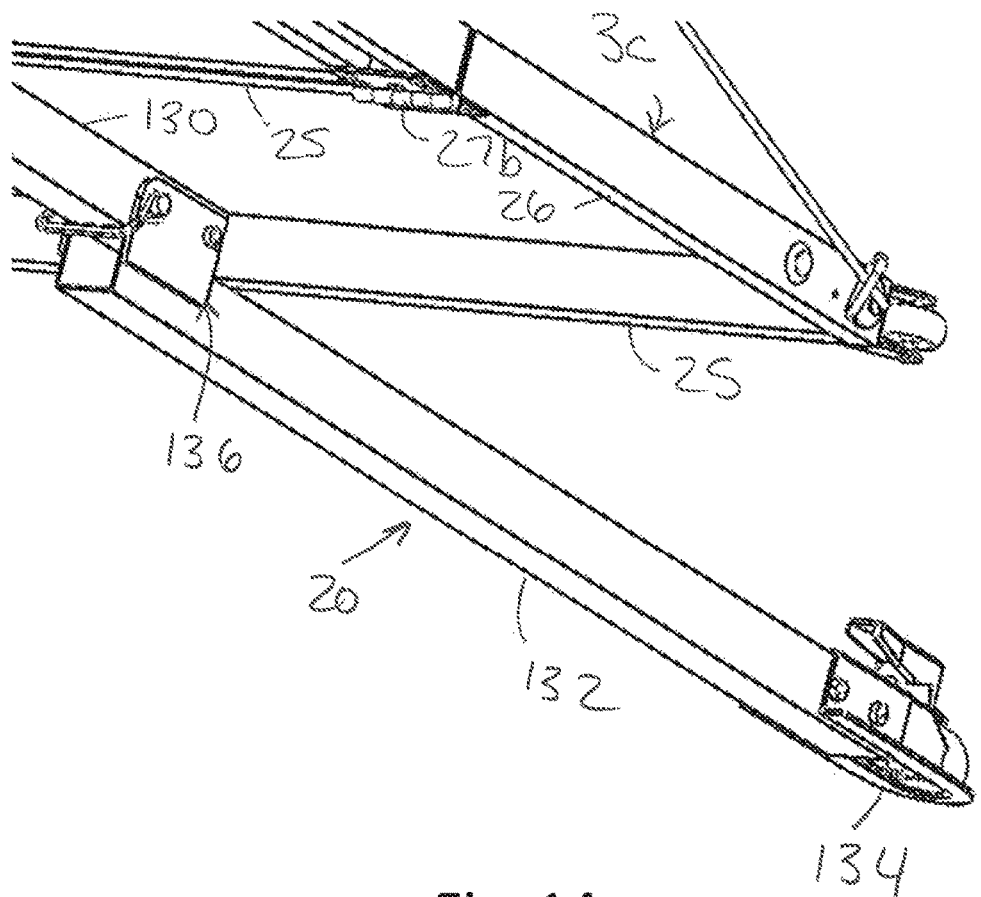
FIG. 14 is a fragmentary, bottom perspective view of the right front corner of the trailer frame showing a coupling between a removable trailer tongue and the front outer frame section.
Figure 15:
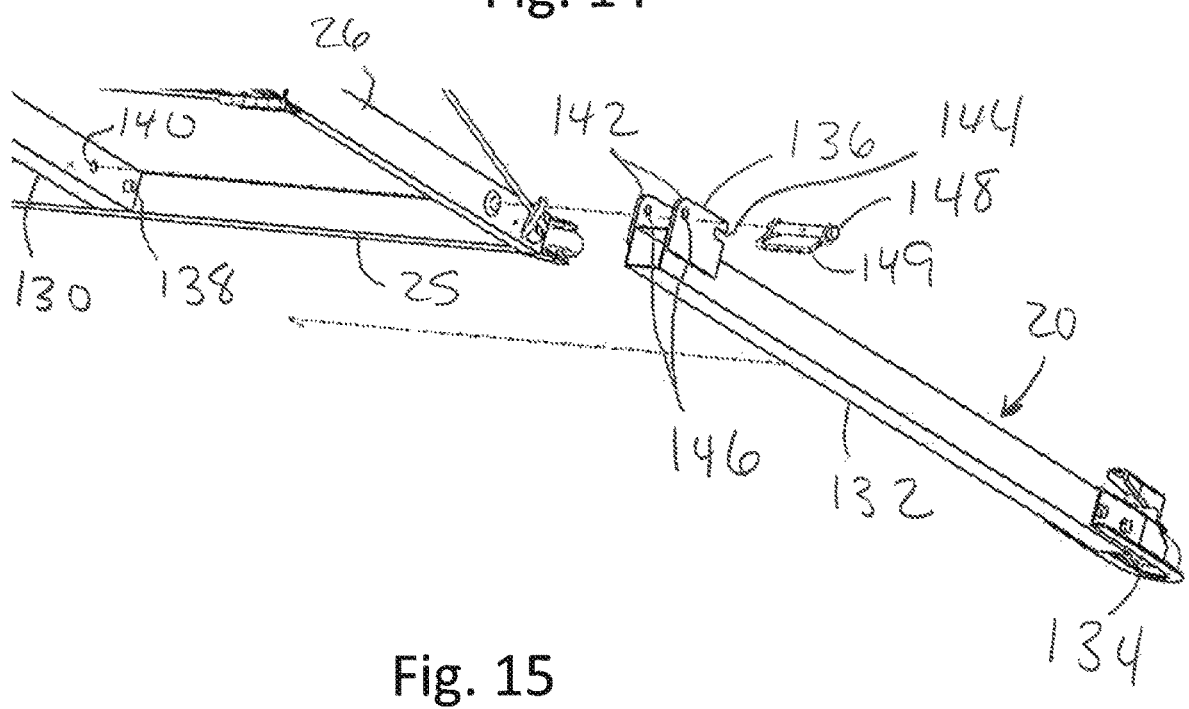
FIG. 15 is a view similar to FIG. 14 showing the trailer tongue exploded away from the front outer frame section.
Figure 16:
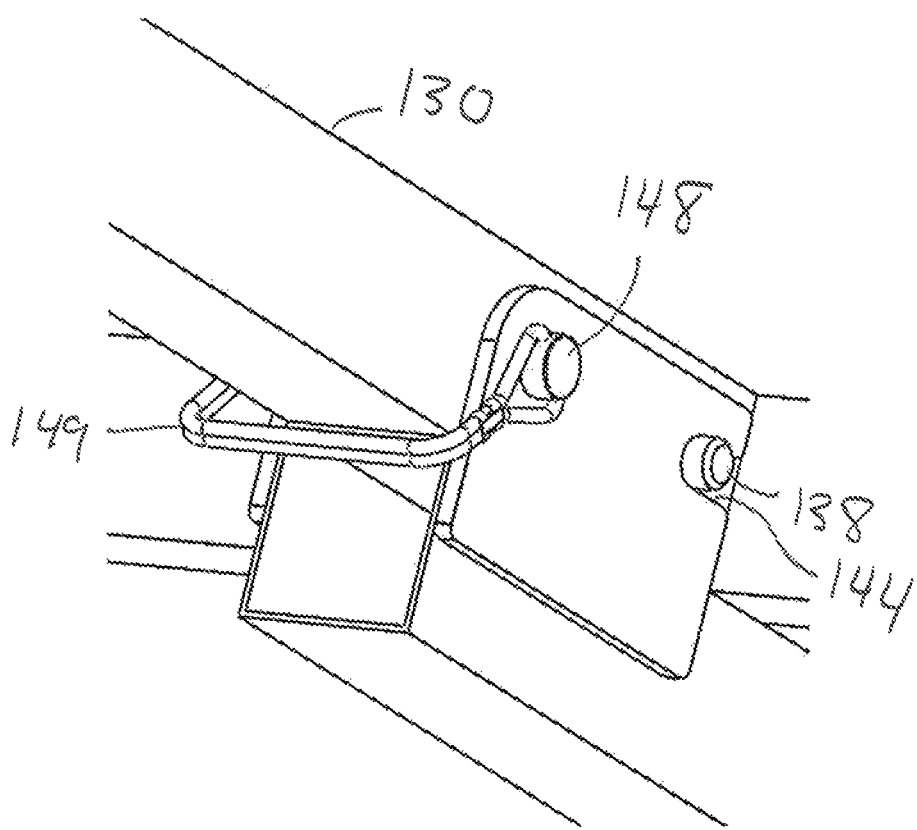
FIG. 16 a greatly enlarged bottom perspective view similar to FIG. 14 showing the coupling in greater detail.

As best seen in FIGS. 14-16, the trailer tongue 20 is removably securable to a tongue mount 130 secured to and extending between the lateral frame members 25 and medially between the side frame members 26 of the outer or front frame section 3c. In the embodiment shown, the tongue 20 comprises a drawbar 132, which in the embodiment shown is formed from a square or rectangular tube, with a trailer coupler 134 connected to a distal end of the drawbar 132 and a connection assembly 136 connected to an inner end of the drawbar 132. The trailer coupler 134 may be of a conventional design and preferably of relatively lightweight construction. The connection assembly 136 is generally formed as a hook to engage mounting pins 138 projecting outward from the tongue mount 130 on opposite sides thereof. A latch pin receiving bore 140 extends through the tongue mount 130 in rearward spaced relation ship from the mounting pins 138.

The connection assembly 136 comprises a pair of mounting plates 142 welded or otherwise secured to the inner end of the tube forming drawbar 132 with a portion of each mounting plate 142 extending above the drawbar 132. A forward-facing notch or recess 144 is formed in the forward end of the portion of each mounting plate 140 extending above the drawbar 132 with the notches 144 in the mounting plates 142 functioning as a hook. A pin receiving hole 146 is formed in each mounting plate 142 in rearward spaced relationship to the notch 144 formed therein. The tongue mount 130 is preferably formed from a tube of the same width as the drawbar 132. The mounting plates 142 secured to the sides of the drawbar 132 are therefore spaced slightly wider than the sides of the tongue mount 130.

The tongue 20 is connected to the front frame section 3c by first positioning the inner end of the tongue 20 below the tongue mount 130 with the mounting plates 142 extending upward toward the tongue mount 130 and spaced rearward from the mounting pins 138. The inner end of the tongue 20 is raised until the upper portions of the mounting plates 142 surround the drawbar 132 and the forward facing notches 144 in the mounting plates 142 are aligned with the mounting pins 138 on the tongue mount 130. The tongue is then pulled forward until the mounting pins 138 are received within the notches 144 and the pin receiving holes 146 in the mounting plates 142 are aligned with the latch pin bore 140 formed in the tongue mount 130. A latch or locking pin 148 is removably insertable through the aligned holes 146 and bore 140 to securely connect the tongue 20 to the tongue mount 130. A bail 149, pivotally connected at a first end to the locking pin 148 may be secured around the distal end of the locking pin 148 to prevent removal of the locking pin 148 from the aligned holes 146 and bore 140. The tongue 20 can be removed from the front frame section 3c by removing the bail 149 from the distal end of the locking pin 148 and then removing the locking pin 148 from the aligned holes 146 and bore 140 and reversing the steps for connecting the tongue mount 130.

Referring again to FIGS. 1 and 4, the planar supports 22 are formed as flat sheets 151 with notches 153 formed in the corners and sized so that a separate sheet 151 of material may be secured across the top of a frame section 3 and edges 155 of the sheet 151 can then be folded over onto the sides of the frame section 3 and secured in place by gluing or other appropriate means including using mechanical fasteners to connect the sheet 151 to the lateral and side frame members 25 and 26. It is foreseen that if the planar supports are formed from a more rigid material, they might be secured to the frame sections 3 by quick release type fasteners to allow the planar supports to be removed prior to folding the frame sections 3 as shown in FIGS. 8A-8F.

Although the foldaway trailer 1 is shown as being formed from four frame sections 3, it is foreseen that the trailer could be formed from two or three frame sections or more than four frame sections. If three frame sections are utilized, it is foreseen that the frame sections could each be the same size or the outer frame sections could be approximately half the length of the center frame section with the two outer frame sections both folding onto the same side (top or bottom) of the center frame section. It is also foreseen that the tower and cable suspension system could be utilized with trailer frames that do not fold and which may be collapsible or reducible in size for storing by other means. It is also foreseen that the trailer frame could be integrally formed with the material forming the trailer bed or sections of the trailer bed. For example, the trailer frame could be formed by a downwardly turned edge of the sheet material forming the trailer bed support surface or the support surface of trailer bed sections.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. A trailer comprising:
   a trailer bed frame having left and right sides each having front and rear ends;
   left and right tension member supports pivotably connected proximate lower ends thereof to the left and right sides respectively of the trailer bed frame medially between the respective front and rear ends of the left and right sides such that the left and right tension member supports are pivotable between a retracted position in which the left and right tension member supports extend in parallel alignment adjacent the left and right sides respectively of the trailer bed frame and an extended position extending upward from the trailer support frame;
   a left, front tension member supported at an inner end on the left tension member support in spaced relation above the trailer bed frame when the left tension support member is pivoted to the extended position and connected at a forward end to a left side of the trailer bed frame forward of the left tension member support;
   a left, rear tension member supported at an inner end on the left tension member support in spaced relation above the trailer bed frame when the left tension support member is pivoted to the extended position and connected at a rearward end to a left side of the trailer bed frame rearward of the left tension member support;
   a right, front tension member supported at an inner end on the right tension member support in spaced relation above the trailer bed frame when the right tension support member is pivoted to the extended position and connected at a forward end to a right side of the trailer bed frame forward of the right tension member support; and
   a right, rear tension member supported at an inner end on the right tension member support in spaced relation above the trailer bed frame when the right tension support member is pivoted to the extended position and connected at a rearward end to a right side of the trailer bed frame rearward of the right tension member support.

2. The trailer as in claim 1 wherein said left, front tension member and said left, rear tension member are formed as a left unitary tension member and said right, front tension member and said right, rear tension member are formed as a right unitary tension member.

3. The trailer as in claim 1 further comprising left and right wheels rotatably mounted on left and right suspensions removably securable to the left and right sides respectively of the trailer bed frame.

4. The trailer as in claim 1 further comprising a trailer tongue removably securable to the trailer bed frame.

5. The trailer as in claim 1 wherein said trailer bed frame is formed from a plurality of frame sections wherein each frame section can be folded relative to an adjacent frame section.

6. The trailer as in claim 5 wherein a sheet of fabric is secured over each of the frame sections to form a trailer bed support surface.

7. The trailer as in claim 6 wherein each of the sheets of fabric is formed from a material having a high tensile strength to weight ratio.

8. A trailer comprising:
   a trailer bed frame having left and right sides each having front and rear ends;

left and right tension member supports connected to and extending upward from the left and right sides respectively of the trailer bed frame medially between the respective front and rear ends of the left and right sides;

a left, front tension member supported at an inner end on the left tension member support in spaced relation above the trailer bed frame and connected at a forward end to a left side of the trailer bed frame forward of the left tension member support;

a left, rear tension member supported at an inner end on the left tension member support in spaced relation above the trailer bed frame and connected at a rearward end to a left side of the trailer bed frame rearward of the left tension member support;

a right, front tension member supported at an inner end on the right tension member support in spaced relation above the trailer bed frame and connected at a forward end to a right side of the trailer bed frame forward of the right tension member support; and a right, rear tension member supported at an inner end on the right tension member support in spaced relation above the trailer bed frame and connected at a rearward end to a right side of the trailer bed frame rearward of the right tension member support;

wherein said trailer bed frame is formed from front and rear inner frame sections and front and rear outer frame sections, the front and rear inner frame sections are hingedly connected together by at least one hinge connected across laterally extending, adjacent inner edges of said front and rear inner frame sections and secured to upper surfaces of the front and rear inner frame sections such that upper surfaces of the front and rear inner frame sections are selectively pivotable toward each other; said front outer frame section is hingedly connected to the front inner frame section by at least one hinge connected across laterally extending, adjacent edges of the front outer frame section and the front inner frame section such that lower surfaces of the front outer frame section and the front inner frame section are pivotable toward each other; and said rear outer frame section is hingedly connected to the rear inner frame section by at least one hinge connected across laterally extending, adjacent edges of the rear outer frame section and the rear inner frame section such that lower surfaces of the rear outer frame section and the rear inner frame section are pivotable toward each other.

9. A trailer comprising:

a trailer bed frame assembly comprising at least first and second frame sections hingedly connected together and pivotable between a folded configuration wherein the at least first and second frame sections extend in overlapping alignment and an unfolded configuration wherein the at least first and second frame sections extend in planar alignment; when said at least first and second frame sections are positioned in the unfolded configuration, the trailer bed frame assembly having left and right sides each having front and rear ends;

left and right tension member supports pivotably connected to the left and right sides respectively of the trailer bed frame assembly medially between the respective front and rear ends of the left and right sides such that the left and right tension member supports are pivotable between a retracted position in which the left and right tension member supports extend in parallel alignment adjacent the left and right sides respectively of the trailer bed frame and an extended position extending upward from the trailer support frame in the unfolded configuration;

a left, front tension member supported at an inner end on the left tension member support in spaced relation above the trailer bed frame assembly when the left tension support member is pivoted to the extended position and connected at a forward end to a left side of the trailer bed frame assembly forward of the left tension member support;

a left, rear tension member supported at an inner end on the left tension member support in spaced relation above the trailer bed frame assembly when the left tension support member is pivoted to the extended position and connected at a rearward end to a left side of the trailer bed frame assembly rearward of the left tension member support;

a right, front tension member supported at an inner end on the right tension member support in spaced relation above the trailer bed frame assembly when the right tension support member is pivoted to the extended position and connected at a forward end to a right side of the trailer bed frame assembly forward of the right tension member support; and a right, rear tension member supported at an inner end on the right tension member support in spaced relation above the trailer bed frame assembly when the right tension support member is pivoted to the extended position and connected at a rearward end to a right side of the trailer bed frame assembly rearward of the right tension member support.

10. The trailer as in claim 9 wherein said left, front tension member and said left, rear tension member are formed as a left unitary tension member and said right, front tension member and said right, rear tension member are formed as a right unitary tension member.

11. A trailer comprising:

a trailer bed frame assembly comprising at least first and second frame sections hingedly connected together and pivotal between a folded configuration wherein the at least first and second frame sections extend in overlapping alignment and an unfolded configuration wherein the at least first and second frame sections extend in planar alignment; when said at least first and second frame sections are positioned in the unfolded configuration, the trailer bed frame assembly having left and right sides each having front and rear ends;

left and right tension member supports connected to and extending upward from the left and right sides respectively of the trailer bed frame assembly in the unfolded configuration and positioned medially between the respective front and rear ends of the left and right sides;

a left, front tension member supported at an inner end on the left tension member support in spaced relation above the trailer bed frame assembly and connected at a forward end to a left side of the trailer bed frame assembly forward of the left tension member support;

a left, rear tension member supported at an inner end on the left tension member support in spaced relation above the trailer bed frame assembly and connected at a rearward end to a left side of the trailer bed frame assembly rearward of the left tension member support;

a right, front tension member supported at an inner end on the right tension member support in spaced relation above the trailer bed frame assembly and connected at a forward end to a right side of the trailer bed frame assembly forward of the right tension member support; and a right, rear tension member supported at an inner end on the right tension member support in spaced relation above the trailer bed frame assembly and connected at a rearward end to a right side of the trailer bed frame assembly rearward of the right tension member support; and left and right wheels rotatably mounted on left and right suspensions removably securable to the left and right sides respectively of the trailer bed frame wherein the left and right suspensions each comprise quarter elliptical leaf spring assemblies.

12. The trailer as in claim 9 further comprising a trailer tongue removably securable to the trailer frame assembly.

13. A trailer comprising:

a trailer bed frame formed from front and rear inner frame sections and front and rear outer frame sections, the front and rear inner frame sections are hingedly connected together by at least one hinge connected across laterally extending, adjacent inner edges of said front and rear inner frame sections and secured to the front and rear inner frame sections such that first vertically orientated faces of the front and rear inner frame sections are selectively pivotable toward each other; said front outer frame section is hingedly connected to the front inner frame section by at least one hinge connected across laterally extending, adjacent edges of the front outer frame section and the front inner frame section and secured to the front outer frame section and the front inner frame section such that second vertically oriented faces of the front outer frame section and the front inner frame section are pivotable toward each other; and said rear outer frame section is hingedly connected to the rear inner frame section by at least one hinge connected across laterally extending, adjacent edges of the rear outer frame section and the rear inner frame section and secured to the rear outer frame section and the rear inner frame section such that second vertically oriented faces of the rear outer frame section and the rear inner frame section are pivotable toward each other.

14. The trailer as in claim 13 further comprising left and right wheels rotatably mounted on left and right suspensions removably securable to left and right sides respectively of the trailer bed frame.

15. The trailer as in claim 14 wherein the left and right suspensions each comprise quarter elliptical leaf spring assemblies.

16. The trailer as in claim 14 wherein each of the left and right suspensions comprises upper and lower leaf springs supported in spaced apart relation by a spacer secured between distal ends of the upper and lower leaf springs and a connector secured between inner ends of the upper and lower leaf springs; the connector having a connector portion extending past the inner ends of the upper and lower leaf springs and removably securable within a receiver formed in a respective left or right side of the front inner frame section; each of the left and right wheels includes a spindle on which the left and right wheels are rotatably mounted with the spindle fixedly secured to the respective left or right suspension proximate a distal end thereof.

17. The trailer as in claim 13 further comprising a trailer tongue removably securable to the front outer frame section of the trailer bed frame.

18. The trailer as in claim 1 further comprising left and right wheels rotatably mounted on left and right suspensions removably securable to the left and right sides respectively of the trailer bed frame wherein the left and right suspensions each comprise quarter elliptical leaf spring assemblies.

* * * * *